United States Patent
Powell

(10) Patent No.: US 8,863,942 B2
(45) Date of Patent: Oct. 21, 2014

(54) CONVEYOR ASSEMBLY AND DOWEL ASSEMBLY

(75) Inventor: Gordon Powell, Malvern (GB)

(73) Assignee: Joy MM Delaware, Inc., Wilmington, DE (US)

( * ) Notice: Subject to any disclaimer, the term of this patent is extended or adjusted under 35 U.S.C. 154(b) by 222 days.

(21) Appl. No.: 13/510,658

(22) PCT Filed: Nov. 19, 2010

(86) PCT No.: PCT/US2010/057358
§ 371 (c)(1),
(2), (4) Date: May 18, 2012

(87) PCT Pub. No.: WO2011/063192
PCT Pub. Date: May 26, 2011

(65) Prior Publication Data
US 2012/0228093 A1    Sep. 13, 2012

Related U.S. Application Data

(60) Provisional application No. 61/262,668, filed on Nov. 19, 2009.

(51) Int. Cl.
*B65G 23/06* (2006.01)
*F16J 15/12* (2006.01)

(52) U.S. Cl.
CPC ..................................... *F16J 15/121* (2013.01)
USPC ........................ 198/834; 198/835; 198/860.1

(58) Field of Classification Search
CPC ........ B65G 19/22; B65G 23/20; B65G 23/08;
B65G 23/04; B65G 21/06
USPC ........................ 198/729, 832, 834, 835, 860.1
See application file for complete search history.

(56) References Cited

U.S. PATENT DOCUMENTS

| | | | | |
|---|---|---|---|---|
| 4,088,328 | A * | 5/1978 | Roeder | 277/336 |
| 6,227,354 | B1 * | 5/2001 | Howden et al. | 198/834 |
| 8,485,530 | B2 * | 7/2013 | Johansson et al. | 277/373 |
| 2009/0078540 | A1 * | 3/2009 | Foster et al. | 198/750.1 |
| 2012/0193563 | A1 * | 8/2012 | Croci | 251/231 |

FOREIGN PATENT DOCUMENTS

CN      201330064       10/2009

OTHER PUBLICATIONS

Australian Patent Examination Report No. 1 for Application No. 2010321834 dated Jun. 24, 2013 (3 pages).
International Search Report and Written Opinion for Application No. PCT/US2010/057358 dated Jan. 24, 2011 (12 pages).
International Preliminary Report on Patentability for Application No. PCT/US2010/057358 dated May 31, 2012 (12 pages).
Office Action from the Opatent Office of the Russian Federation, Federal Institute of Industrial Property for Application No. 2012124839 dated May 24, 2013 (8 pages).
Chinese Office Action for Application No. 201080052582.8 dated Dec. 4, 2013 (21 pages, English translation included).
United Kingdom Intellectual Patent Office Examination Report for Application No. GB1209717.6 dated Jan. 30, 2014 (2 pages).

* cited by examiner

*Primary Examiner* — Ramya Burgess
*Assistant Examiner* — Lester Rushin
(74) *Attorney, Agent, or Firm* — Michael Best & Friedrich LLP

(57) ABSTRACT

A conveyor and a dowel assembly. The dowel assembly may generally include a dowel body positioned between the frame and the housing and a seal arrangement. The seal arrangement may include an end seal member engageable with the end wall of the recess, and a side seal member engageable with the side wall of the recess, and a carrier member supported by the dowel body and supporting one of the end seal member and the side seal member, the carrier member being supported for movement relative to the dowel body to provide engagement of the one of the end seal member and the side seal member with the associated one of the end wall and the side wall.

33 Claims, 9 Drawing Sheets

CONVEYOR ASSEMBLY AND DOWEL ASSEMBLY

RELATED APPLICATION

The present application claims priority to U.S. Provisional Patent Application No. 61/262,668, filed Nov. 19, 2009, the entire contents of which are hereby incorporated by reference.

FIELD OF INVENTION

The invention generally relates to conveyors and, more particularly, to a chain conveyor, such as a scraper chain conveyor for underground Longwall mining.

SUMMARY

Amour Face Conveyers use very heavy-duty sprockets to pull a chain around the conveyor. The sprocket units are an assembly of many machined parts including bearings and seals, resulting in an inevitable tolerance build-up across the length (width of the conveyor) of the sprocket unit. The sprockets are fed with oil delivered from remote header tanks and entering the sprocket unit through two large dowels that are located into holes within the conveyor drive frame support structure. One dowel may provide an oil path into the sprocket unit, and the other may provide a path out of the sprocket unit. The dowels also prevent the static sprocket barrel housing from rotating.

The use of dowels to provide oil pathways creates an unusual oil sealing problem in that the sprocket unit dowel centers can only be held to an accuracy of a couple of millimeters, and the dowels have to engage with fixed dowel holes machined into the sprocket support frame. It has also proven difficult to reliably and accurately machine these holes into these very large, heavy support frames that typically weigh ten to twenty tons. The resulting variations are generally beyond the sealing range of fixed o-rings oil seals with regards to sealing on the bottom of the frame dowel holes and sealing against the diameter. A "Quad" ring type Nitrile seal has increased flexibility over the standard o-ring to accommodate the centers error, but such Quad Nitrile seals are very vulnerable to damage during assembly.

FIGS. 11A-11B illustrate an existing dowel having a single o-ring on its end face and a Quad ring to seal on the dowel diameter. The location or hole for the dowel is difficult to machine due to the large size of the head frames. The dowel hole may also have poor surface finish. In addition, tolerance build up in the sprocket unit assembly and the housing assembly may cause a lack of concentricity between the dowel holes in the housing assembly and in the head frame (not shown). There may also be a variation in the depth of dowel holes. The resulting demands on the seals are extreme.

The present new sealing arrangement may generally provide a seal at the end of the dowel and a seal on the outside diameter of the dowel and is designed to accommodate the variations in the dowel holes of the housing assembly and the head frame. In the present design, both seals are able to operate over a greater range of movement and concentricity resulting as much due to build tolerances as well as operational movement. The use of multiple o-rings may increase the working range of effective sealing.

The present dowel assembly may accommodate the variation of depth in the dowel holes of the housing assembly and the head frame. To increase the sealing range of the seal located at the end of a dowel or shaft, the end seal is supported on the sliding end carrier, which is biased/spring-loaded to achieve the desired movement range of the seal. The carrier also correctly supports and protects the working seal during transportation and operation.

To accommodate the excessive concentricity that can be expected between the sprocket housing dowel hole and head frame dowel hole, the outside diameter side seal uses a torroidal slip ring/side carrier that correctly supports and protects the working seal over a wide range of operational positions. One portion of the dowel is undersized relative to the head frame location hole to accommodate large tolerance build up across the sprocket assemblies. The side seal automatically self-centers as the dowel or shaft enters the locating hole and is itself sealed by the secondary o-rings in the groove formed in the dowel. At all times and positions, the working outer seal member is correctly supported by the torroidal carrier and is free to find the center of the mating recess.

In one independent embodiment, a dowel assembly is provided for a conveyor assembly. The conveyor assembly includes a frame defining a first recess having an end wall and a side wall and a first port communicating with the first recess, a housing supported by the frame, the housing defining a second recess having an end wall and a side wall and a second port communicating with the second recess, a drive shaft rotatably supported in the housing, and a sprocket supported on the drive shaft for rotation with the drive shaft. The dowel assembly may generally include a dowel body positioned between the frame and the housing and a seal arrangement.

The dowel body may have a first end portion received in the first recess and a second end portion received in the second recess, the dowel body defining a passageway having a first end communicating with the first port and a second end communicating with the second port. The seal arrangement may include an end seal member arranged on one of the first end portion and the second end portion and engageable with the end wall of the associated one of the first recess and the second recess, and a side seal member engageable with the side wall of the associated one of the first recess and the second recess, and a carrier member supported by the dowel body and supporting one of the end seal member and the side seal member, the carrier member being supported for movement relative to the dowel body to provide engagement of the one of the end seal member and the side seal member with the associated one of the end wall and the side wall.

In another independent embodiment, a dowel assembly may generally include a dowel body positioned between the frame and the housing, the dowel body extending along an axis, the dowel body having a first end portion received in the first recess and a second end portion received in the second recess, the dowel body defining a passageway having a first end communicating with the first port and a second end communicating with the second port; and a seal arrangement. The seal arrangement may include an end seal member arranged on the first end portion and engageable with the end wall of the first recess, and a carrier member supported by the dowel body and supporting the end seal member, the carrier member being supported for movement along the axis relative to the dowel body to provide engagement of the end seal member with the end wall.

In yet another independent embodiment, a dowel assembly may generally include a dowel body positioned between the frame and the housing, the dowel body extending along an axis, the dowel body having a first end portion received in the first recess and a second end portion received in the second recess, the dowel body defining a passageway having a first end communicating with the first port and a second end communicating with the second port; and a seal arrangement. The seal arrangement may include a side seal member arranged on the first end portion and engageable with the side wall of the first recess, and a carrier member supported by the dowel body and supporting the side seal member, the carrier member being supported for movement transverse to the axis relative to the dowel body to provide engagement of the side seal member with the side wall.

In a further independent embodiment, a dowel assembly may generally include a dowel body positioned between the frame and the housing, the dowel body extending along an axis, the dowel body having a first end portion received in the first recess and a second end portion received in the second recess, the dowel body defining a passageway having a first end communicating with the first port and a second end communicating with the second port; and a seal arrangement. The seal arrangement may include an end seal member arranged on the first end portion and engageable with the end wall of the first recess, a first carrier member supported by the dowel body and supporting the end seal member, the first carrier member being supported for movement along the axis relative to the dowel body to provide engagement of the end seal member with the end wall, a side seal member arranged on the first end portion and engageable with the side wall of the first recess, and a second carrier member supported by the dowel body and supporting the side seal member, the second carrier member being supported for movement transverse to the axis relative to the dowel body to provide engagement of the side seal member with the side wall.

In still another independent embodiment, a conveyor assembly may generally include a frame defining a first recess and a first port communicating with the first recess; a housing supported by the frame, the housing defining a second recess and a second port communicating with the second recess; a dowel assembly positioned between the frame and the housing, a drive shaft rotatably supported in the housing; and a sprocket supported on the drive shaft for rotation with the drive shaft.

The dowel assembly may include a dowel body positioned between the frame and the housing, the dowel body extending along an axis, the dowel body having a first end portion received in the first recess and a second end portion received in the second recess, the dowel body defining a passageway having a first end communicating with the first port and a second end communicating with the second port; and a seal arrangement. The seal arrangement may include an end seal member arranged on the first end portion and engageable with the end wall of the first recess, a first carrier member supported by the dowel body and supporting the end seal member, the first carrier member being supported for movement along the axis relative to the dowel body to provide engagement of the end seal member with the end wall, a side seal member arranged on the first end portion and engageable with the side wall of the first recess, and a second carrier member supported by the dowel body and supporting the side seal member, the second carrier member being supported for movement transverse to the axis relative to the dowel body to provide engagement of the side seal member with the side wall.

Other independent aspects of the invention will become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Figure 11A:
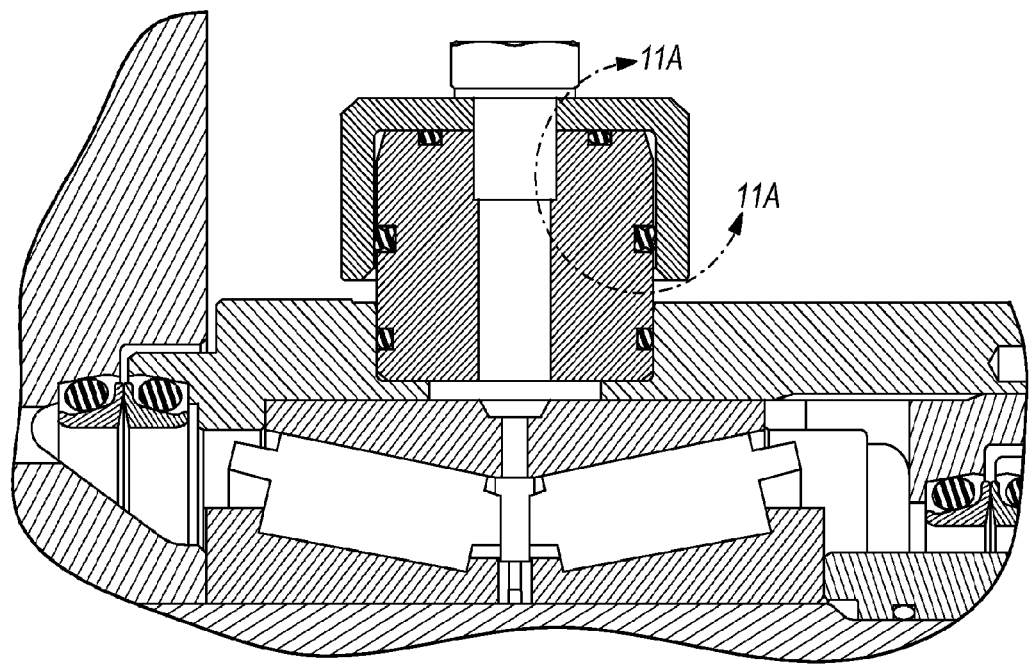
FIGS. 11A-11B are cross-sectional views of an existing dowel assembly with a conveyor assembly.

FIGS. 1-5 illustrate a portion of a conveyor assembly 10 including a dowel assembly 14. In the illustrated construction, the conveyor assembly 10 is provided with the dowel assemblies 14. The dowel assemblies 14 may be used with and retrofitted into an existing conveyor assembly to replace its existing dowel(s) (see FIG. 11A).

The conveyor assembly 10 includes a sprocket unit assembly 18. The sprocket unit assembly 18 includes a plurality of sprocket members 22 supported for rotation with a drive shaft 26 (see FIG. 2). Splines 30 drivingly connect the drive shaft 26 and the sprocket members 22. Drive splines 34 are provided on the drive shaft 26 and are drivingly engaged with a drive unit 38 operable to rotate the drive shaft 26 and the sprocket members 22.

A sprocket barrel bearing housing assembly 42 supports the sprocket unit assembly 18. Bearings 46 rotatably support the drive shaft 26 in the housing assembly 42. Seal assemblies 50 are provided to seal the sprocket unit assembly 18 and the housing assembly 42. The housing assembly 42 defines a number of dowel locations, holes or recesses 54 (two in the illustrated construction) for receiving a dowel assembly 14. A port 58 (see FIG. 10A) is defined through the end wall of the recess 54 and communicates with the interior of the housing assembly 42 (in the area of the bearings 46). Lubricant or oil is supplied through the port 58 to or from the bearings 46 and sprocket unit assembly 18.

As shown in FIGS. 1-5, a head frame 62 supports the housing assembly 42 and the sprocket unit assembly 18. The conveyor assembly 10 includes a delivery or main gate head frame (not shown) at the delivery end of the conveyor assembly 10 and a return or tail gate head frame at the receiving end of the conveyor assembly 10. The head frame 62 (see FIG. 2) defines a corresponding number of dowel locations, holes or recesses 66 (also two in the illustrated construction) for receiving each dowel assembly 14. A port 70 (see FIG. 10A)

is defined through the end wall of the recess 66, and a fluid passage 74 (see FIGS. 1-3 and 5) communicates with the port 70.

In the illustrated construction (see FIGS. 1 and 5), two dowel assemblies 14 are positioned between the housing assembly 42 and the head frame 62. The dowel assemblies 14 prevent or limit relative rotation between the housing assembly 42 and the head frame 62. Each dowel assembly 14 is also constructed to supply lubricant between the head frame 62 and the housing assembly 42 (and the bearings 46 and the sprocket unit assembly 18).

It should be understood that, in other constructions (not shown), a different number of dowel assemblies 14 may be provided between the housing assembly 42 and the head frame 62. It should also be understood that, in other constructions (not shown), each recess 54, 66 and associated dowel assemblies 14 may be provided in a different location on the housing assembly 42 and the head frame 62.

Figure 1:
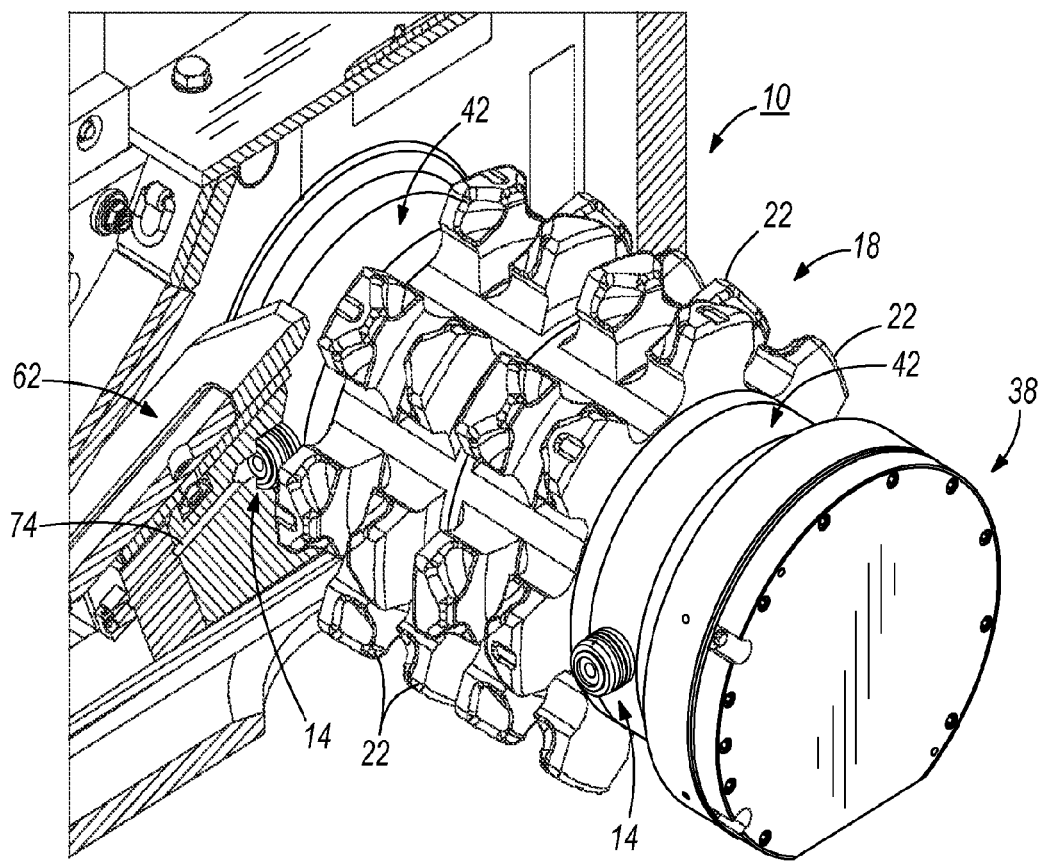
FIG. 1 is a perspective view of portions of a conveyor assembly including a dowel assembly.
Figure 2:
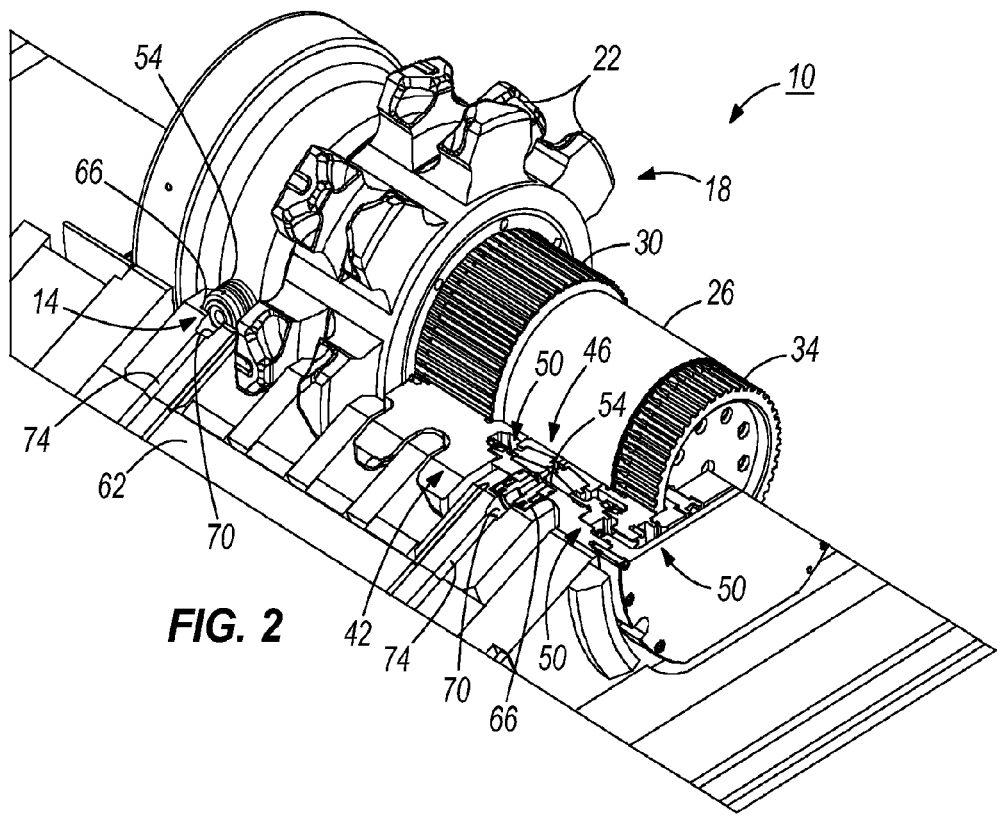
FIG. 2 is a perspective view of portions of the conveyor assembly shown in FIG. 1
Figure 3:
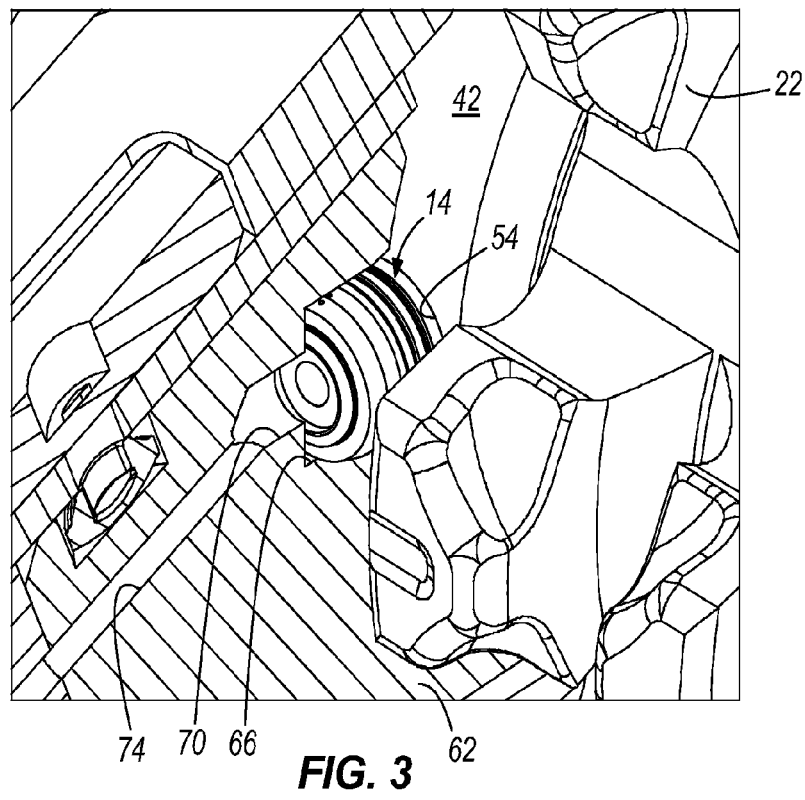
FIG. 3 is an enlarged partial cross-sectional perspective view of a portion of the conveyor assembly shown in FIG. 1.
Figure 4:
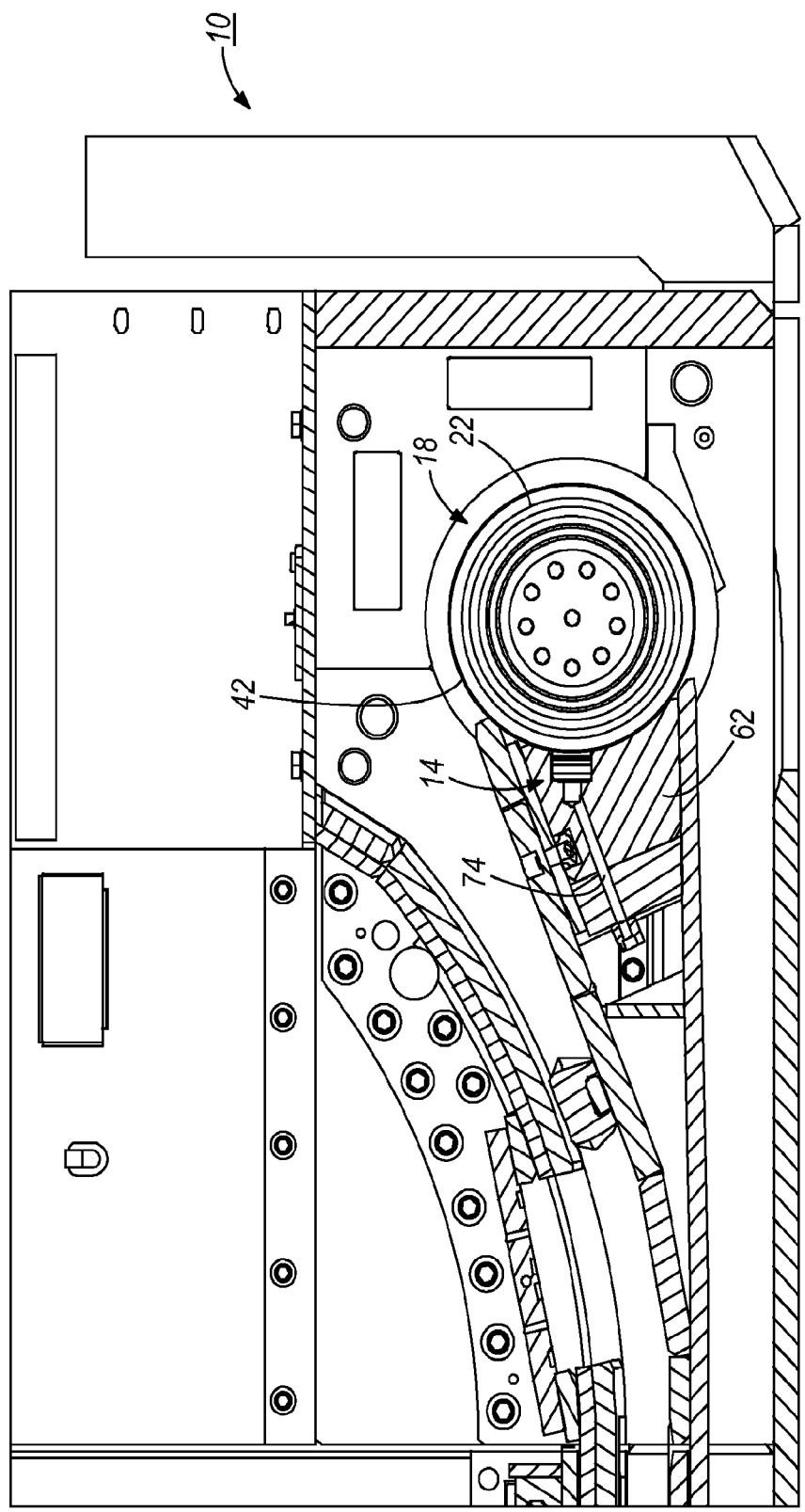
FIG. 4 is a partial cross-sectional side view of the conveyor assembly.
Figure 5:
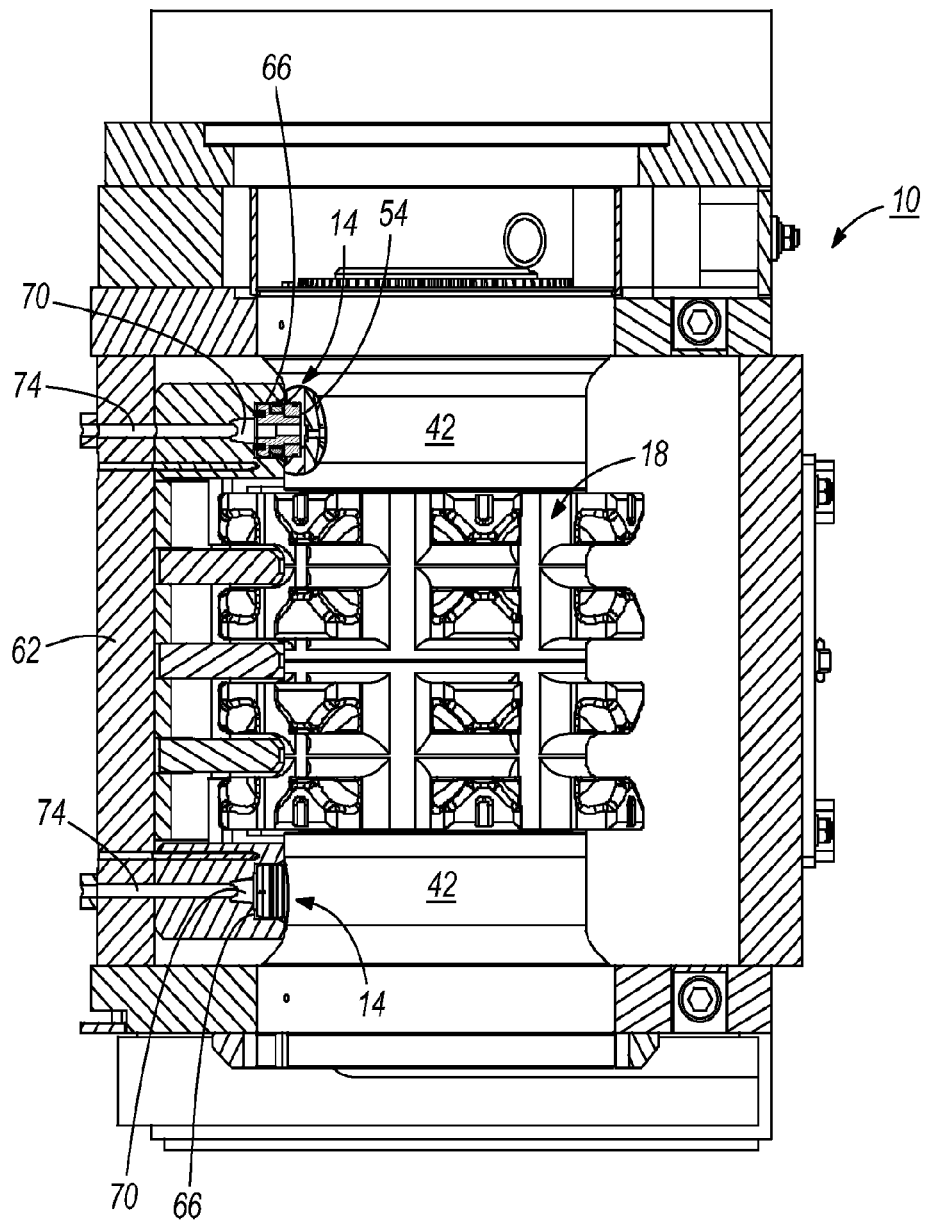
FIG. 5 is a partial cross-sectional top view of the conveyor assembly shown in FIG. 1.
Figure 6:
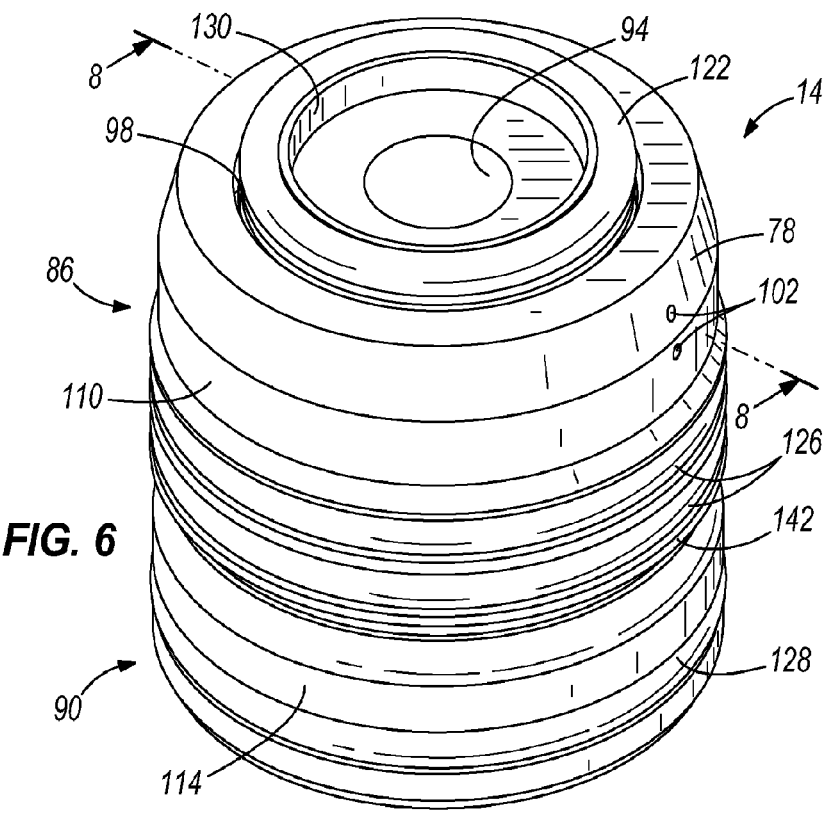
FIG. 6 is a perspective view of the dowel assembly shown in FIG. 1.
Figure 7:
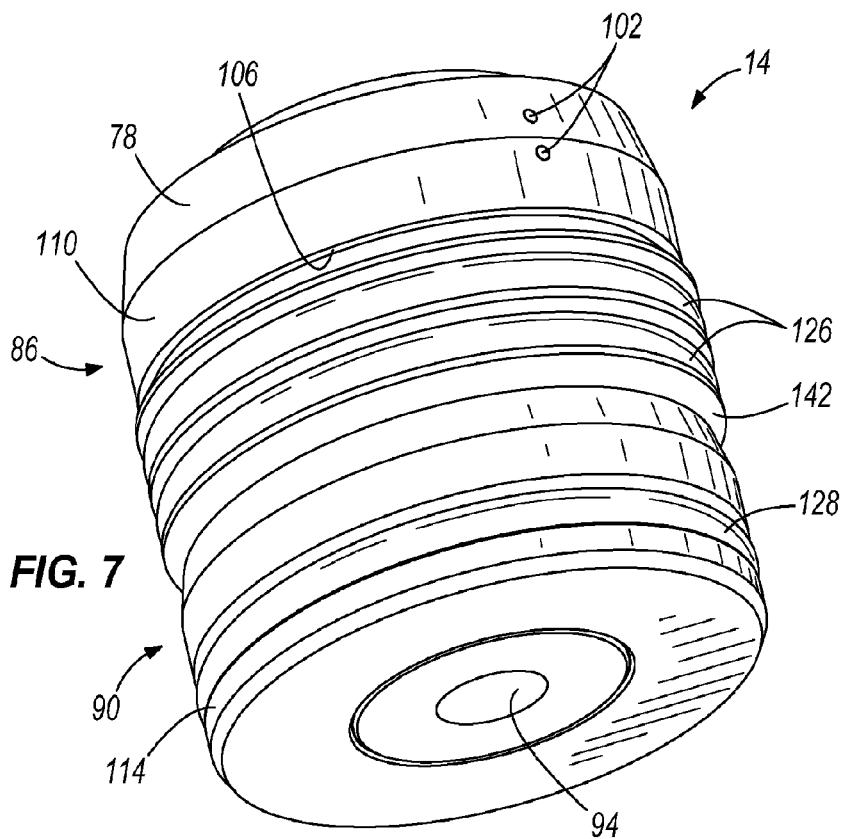
FIG. 7 is another perspective view of the dowel assembly shown in FIG. 6.
Figure 8:
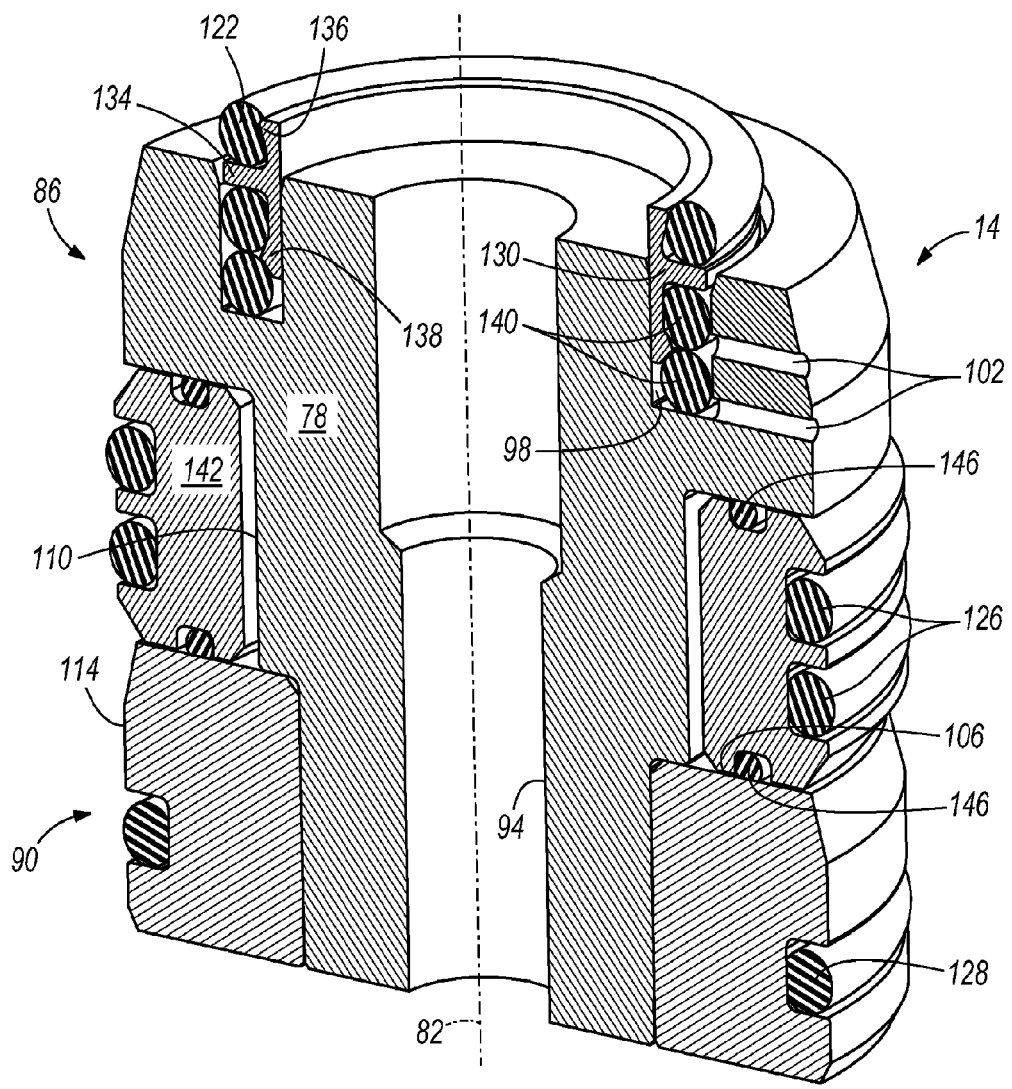
FIG. 8 is a cross-sectional perspective view of the dowel assembly shown in FIG. 6.
Figure 9:
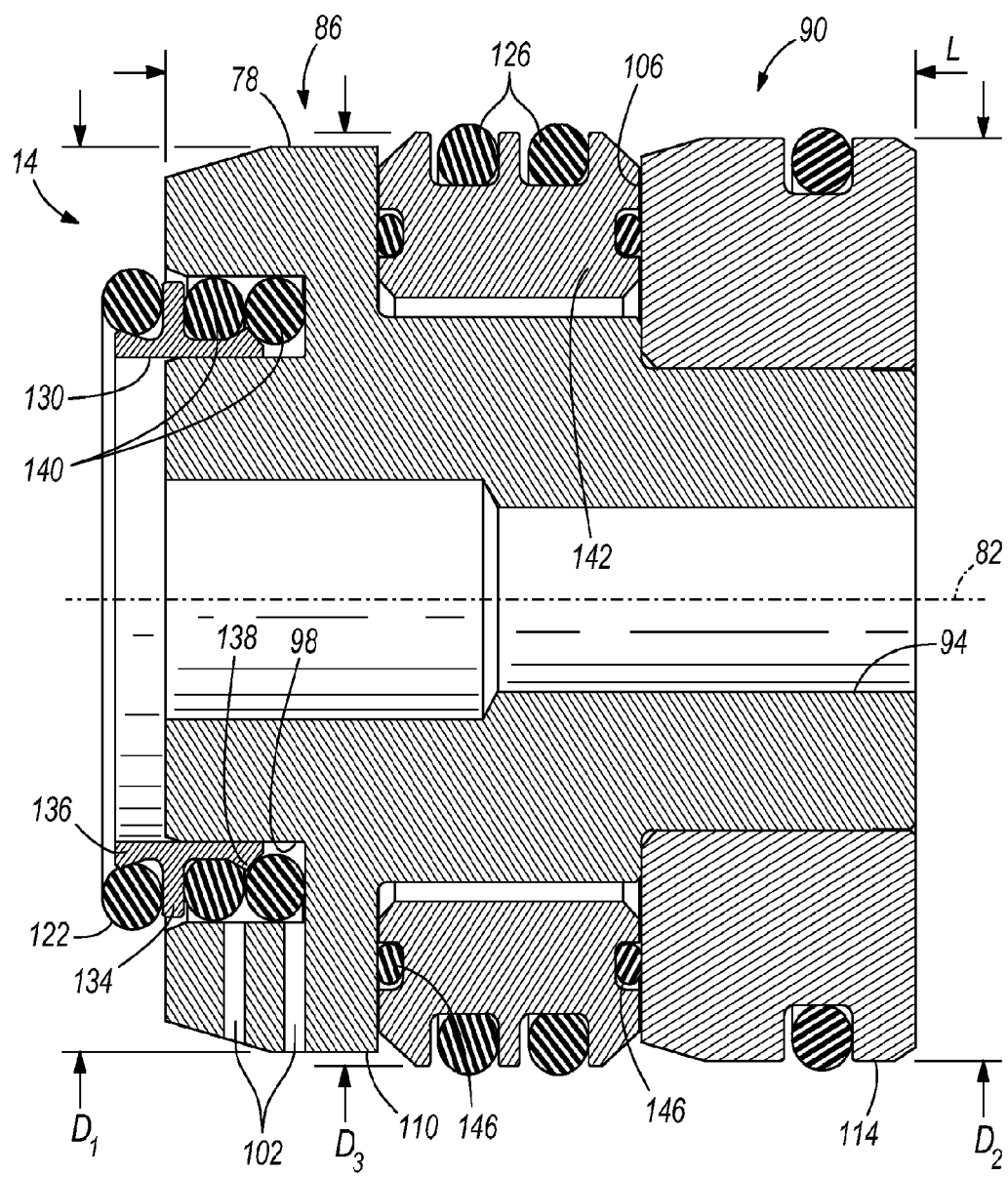
FIG. 9 is a cross-sectional side view of the dowel assembly shown in FIG. 6.
Figure 10A:
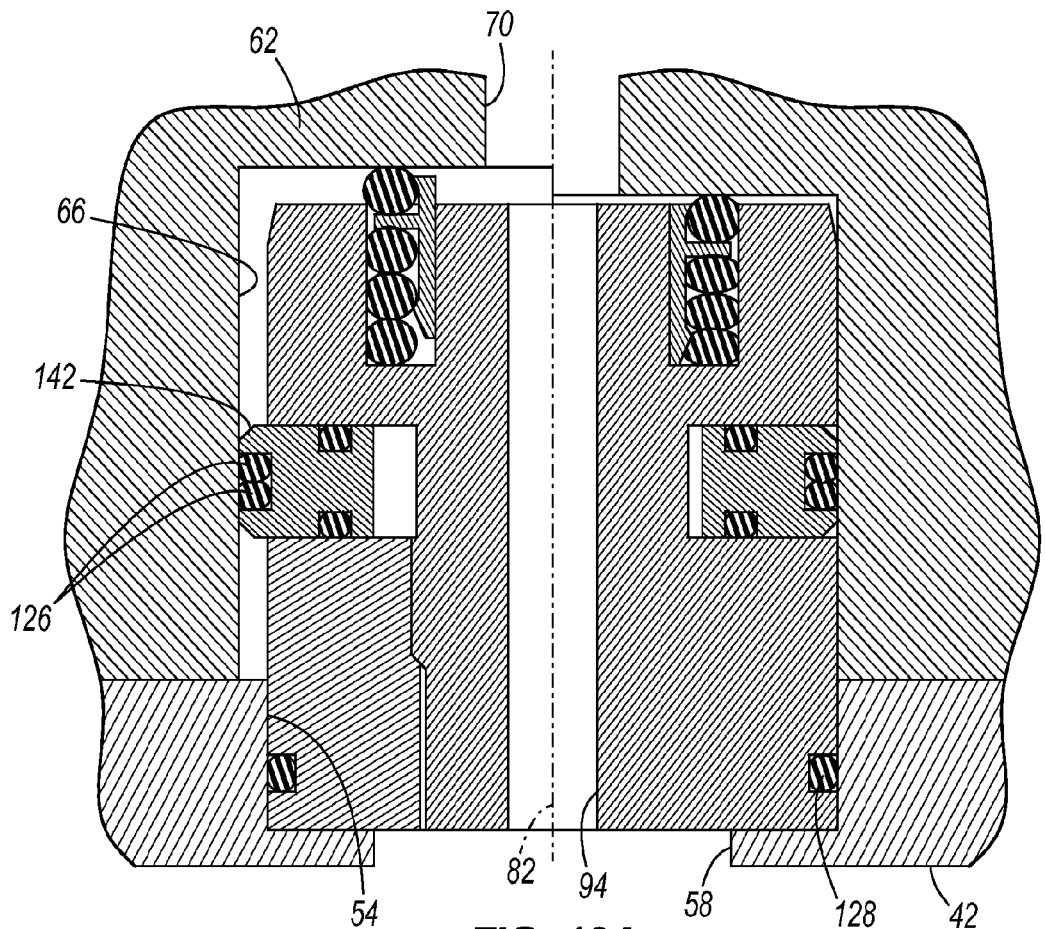
FIG. 10A is a schematic illustration of an alternative construction of a dowel assembly and a portion of a conveyor assembly.

As shown in FIGS. 6-10, each dowel assembly 14 includes a dowel body 78 extending along an axis 82 and having a length L (see FIGS. 9 and 10A). As shown in FIG. 10A, the dowel body 14 includes a first portion 86 received in the recess 66 of the head frame 62 and a second portion 90 received in the recess 54 of the housing assembly 42. A passageway 94 extends through the dowel body 78 and has a first end communicating with the port 70 of the head frame 62 and a second end communicating with the port 58 of the housing assembly 42.

In the illustrated construction (see FIGS. 8-10), the dowel body 78 defines an axially-opening, annular end groove 98. One or more vent passages 102 (see FIG. 8) communicate from the outer surface of the dowel body 78 and into the groove 98. In the illustrated construction (see FIGS. 8-9), the dowel body 78 also defines a radially-opening, annular side groove 106, and a main body portion 110 and a separate end body portion 114 cooperate to define the side groove 106. The main body portion 110 and the end body portion 114 are connected by, for example, press-fitting, welding, etc. As shown in FIG. 9, the first portion 86 of the dowel body 78 has a first diameter $D_1$, and the second portion 90 of the dowel body 78 (e.g., the end body portion 114) has a second diameter $D_2$.

The dowel assembly 14 also (see FIGS. 6-10) includes a seal arrangement to seal the interface between the dowel assembly 14 and the housing assembly 42 and the head frame 62. In the illustrated construction, the seal arrangement includes an end seal member122 (such as an o-ring) engageable with the end wall of the recess 66, and a side seal member 126 (two o-rings shown) engageable with the side wall of the recess 66. A seal 128 is supported on the second portion 90 to seal the interface between the dowel body 78 and the recess 54.

At least one (and, in the illustrated construction, both) of the seal members 122 and 126 are supported for movement relative to the dowel body 78. In the illustrated construction (see FIGS. 8-10), an end carrier 130 supports the end seal member 122 for movement along the axis 82 (along axial arrow A). The carrier 130 has an axial wall and a radial wall 134 and radial lips 136 and 138 extending from the axial wall. The radial lip 136 retains the seal member 122 on the carrier 130.

The carrier 130 is supported in the end groove 98. The carrier 130 is biased outwardly from the groove 98. A biasing arrangement is provided between the end wall of the recess 66 and the radial wall 134 of the carrier 130. In the illustrated construction, the biasing arrangement includes one or more o-rings 140. In other constructions (not shown), the biasing arrangement may include different biasing structure such as a spring member, an elastomeric member, etc.

Figure 10B:
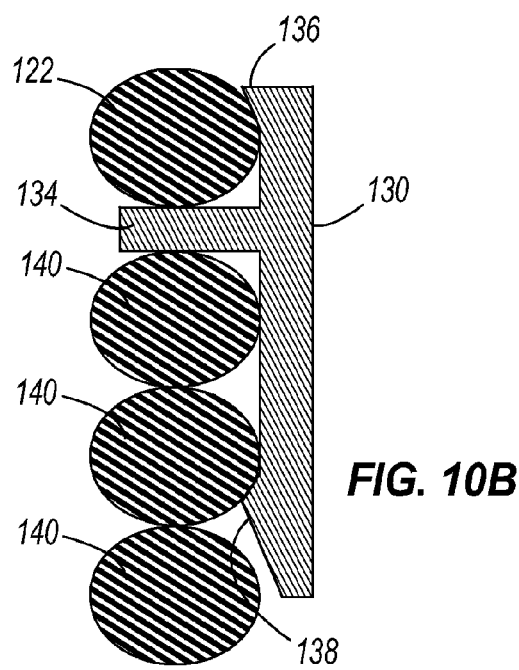
FIG. 10B is an enlarged cross-sectional view of a portion of the dowel assembly.

As shown in FIGS. 8-10, at least one o-ring 140 is captured between the radial wall 134 and the radial lip 138. The o-ring(s) 140 provide a seal between the carrier 130 and the recess 66. The o-ring(s) 140 also operate to retain the carrier 130 in the groove 98. The vent passage(s) 102 (see FIG. 8) allow between the groove 98 and the exterior of the dowel body 78 to limit resistance to movement of the carrier 130 in the groove 98.

In the illustrated construction (see FIGS. 8-10), a side carrier 142 supports the side seal member 126 for movement transverse to the axis 82 (along transverse arrow T). Seals 146 are provided between the carrier 142 and the side groove 106. As shown in FIG. 9, the carrier 142 has an outer diameter $D_3$. The carrier 142 has an inside diameter greater than the diameter of the dowel body 78 in the area of the groove 106 to enable transverse movement of the carrier 142 and the seal member 126 relative to the dowel body 78.

To assemble the dowel assembly 14, the end seal member 122 and biasing member (o-ring(s) 140) are supported on the end carrier 130, and the combination is inserted into the end groove 98. The side seal member 126 and seals 146 are supported on the side carrier 142, and the carrier 142 is slid onto the main body portion 110. The end body portion 114 is connected to the main body portion 110 (e.g., by press-fitting) to capture the carrier 142 and the seal member 126 on the dowel body 78.

Once assembled, the dowel assembly 14 is positioned between the housing assembly 42 and the head frame 62. In the illustrated construction, each dowel assembly 78 is first connected to the housing assembly 42. The second portion 90 is inserted into the recess 54 and connected to the housing portion 42, for example, by press-fitting. A lead-in surface is provided on the end of the second portion 90 to facilitate insertion. The second end of the passageway 94 is positioned in communication with the port 58. The sprocket unit assembly 18 and the sprocket barrel bearing housing assembly 42 (with the dowel assembly 78) may then be transported, stored, etc., as a unit. An end cap (such as that shown in FIG. 11A) may be used to close the passageway 94 for transport, storage, etc.

When the housing assembly 42 is supported on the head frame 62, the first portion 86 of the dowel body 78 is received in the recess 66 in the head frame 62 with the first end of the passageway 94 in communication with the port 70. A lead-in surface is provided on the first portion 86 to facilitate insertion. The end seal member 122 is movable with the end carrier 130 under the force of the biasing member into engagement with the end wall of the recess 66 to accommodate for a difference between the combined depth of the recesses 54 and 66 and the length L of the dowel body 78. As shown in the left portion of FIG. 10A, if there is a difference, the carrier 130 and the end seal member 122 may cooperate with the end walls to form a chamber between the port 70 and the first end of the passageway 94.

In the illustrated construction, the length L of the dowel body 78 is approximately 71 mm. The carrier 130 and end seal member 122 may be moveable to accommodate a difference between the combined depths of the recesses 54, 66 and the length L of the dowel body 78 of, for example, 6 mm. It should be understood that, in other constructions (not shown), the end seal member 122 may be movable a different amount to accommodate a lesser or greater difference between the combined depths of the recesses 54, 66 and the length L of the dowel body 78.

A lead-in surface is also provided on at least the leading side of the side carrier 142, and the side seal member 126 is laterally shiftable (see the left portion of FIG. 10A) with the side carrier 142 into engagement with the side wall of the recess 66 to accommodate misalignment between the port 70 in the head frame 62 and the port 58 in the housing assembly 42. As shown in FIG. 10A, the end seal member 122 has a sufficient diameter to surround the perimeter of and seal the port 70 in its off-center position relative to the port 58 and to the passageway 94.

The diameter $D_2$ of the second portion 90 is generally a close fit to the recess 54, and the seal 128 accommodates minor differences in the diameters. The diameter $D_1$ of the first portion 86 is smaller than the diameter $D_2$ of the second portion 90 and smaller than the diameter of the recess 66. However, the diameter $D_3$ of the side carrier 142 is generally the same as that of the recess 66, and the side seal member 126 accommodates minor differences in the diameters. The side carrier 142 and the side seal member 126 are shiftable relative to the dowel body 78 through a range of movement sufficient to accommodate the relative off-center position of the ports 58, 70. As mentioned above, the carrier 142 has an inside diameter greater than the diameter of the dowel body 78 in the area of the groove 106 to enable this range of transverse movement.

For example, in the illustrated construction, the diameter $D_2$ is approximately 80 mm, and the diameter $D_1$ is approximately 77 mm. The side seal member 126 is movable about 3 mm to accommodate an error in the centers of the ports 58, 70 of 1.5 mm in each direction. It should be understood that, in other constructions (not shown), the side seal member 126 may be movable a different amount to accommodate a different range of center error.

In the present construction, the dowel body 78 and the carriers 130, 142 are formed of metal, such as steel. The dowel body 78 and the seal carrier(s) 130, 142 can be manufactured in a normal machine shop. In other constructions (not shown), the structures may be formed of different materials and/or in a different manner. For example, the side carrier 142 may be formed of a flexible material such that the carrier 142 may stretch over the dowel body 78 and retract into the side groove 106.

Figure 11B:
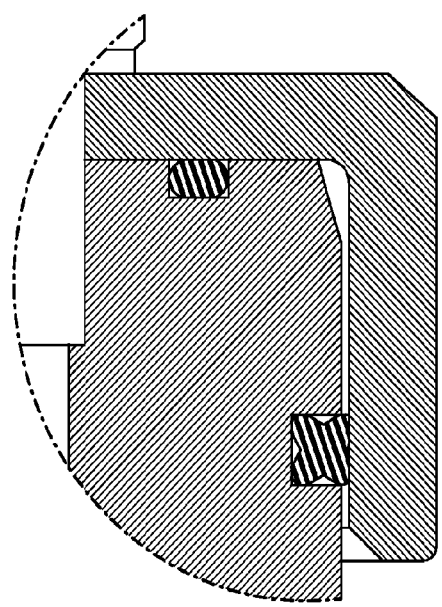

The present dowel assembly 14 may use standard parts including standard seal components, such as standard rubber o-rings, but the principle can be adapted to custom seals and spring mechanisms. Employing larger diameter o-rings may increase the sealing area footprint which may improve the sealing capability on poor surface finishes. The o-rings may have a lower Shore Hardness than typical o-rings used on the existing dowel assembly shown in FIGS. 11A-11B.

Also, each illustrated seal member 122, 126 is separate from its carrier 130, 142. However, in other constructions (not shown), the seal and its carrier may be formed as a unitary member providing both a carrier structure and a seal structure. For example, a rigid carrier material may be combined (e.g., co-molded) with a resilient seal material to provide the unitary carrier/seal structure. Such a unitary structure may provide other features, such as, for example, the biasing, retaining and/or sealing provided by the o-ring(s) 140.

Thus, the invention may provide, among other things, a dowel assembly with an end seal and a side seal, either or both of which are supported by a movable carrier. The invention may provide a conveyor assembly with one or more of such dowel assemblies. Various independent features and independent advantages of the invention are set forth in the following claims.

What is claimed is:

1. A dowel assembly for a conveyor assembly, the conveyor assembly including a frame defining a first recess having an end wall and a side wall and a first port communicating with the first recess, a housing supported by the frame, the housing defining a second recess having an end wall and a side wall and a second port communicating with the second recess, a drive shaft rotatably supported in the housing, and a sprocket supported on the drive shaft for rotation with the drive shaft, the dowel assembly comprising:

a dowel body positioned between the frame and the housing, the dowel body having a first end portion received in the first recess and a second end portion received in the second recess, the dowel body defining a passageway having a first end communicating with the first port and a second end communicating with the second port; and a seal arrangement including an end seal member arranged on one of the first end portion and the second end portion and engageable with the end wall of the associated one of the first recess and the second recess, and a side seal member engageable with the side wall of the associated one of the first recess and the second recess, and a carrier member supported by the dowel body and supporting one of the end seal member and the side seal member, the carrier member, once assembled being supported for movement relative to the dowel body to provide engagement of the one of the end seal member and the side seal member with the associated one of the end wall and the side wall to accommodate for a difference between an associated one of a depth of the first recess and the second recess and a position of the first port and the second port.

2. The dowel assembly of claim 1, wherein the seal arrangement is arranged on the first end portion of the dowel body, the end seal member being engageable with the end wall of the first recess and the side seal member being engageable with the side wall of the first recess.

3. The dowel assembly of claim 1, wherein the dowel body extends along an axis, and wherein the carrier member supports the end seal member, the carrier member and the end seal member being movable along the axis relative to the body to provide engagement of the end seal member with the end wall.

4. The dowel assembly of claim 1, wherein the dowel body extends along an axis, and wherein the carrier member supports the side seal member, the carrier member and the side seal member being movable transverse to the axis relative to the body to provide engagement of the side seal member with the side wall.

5. The dowel assembly of claim 4, wherein the seal arrangement includes a second carrier member supporting the end seal member, the second carrier member and the end seal member being movable along the axis relative to the body to provide engagement of the end seal member with the end wall.

6. The dowel assembly of claim 1, wherein the one of the first end portion and the second end portion not supporting the end seal member is press-fitted into the associated one of the first recess and the second recess.

7. The dowel assembly of claim 1, wherein the end seal member includes a first o-ring engageable with the end wall of the associated one of the first recess and the second recess, and wherein the side seal member includes two axially-spaced o-rings engageable with the side wall of the associated one of the first recess and the second recess.

8. A dowel assembly for a conveyor assembly, the conveyor assembly including a frame defining a first recess having an end wall and a first port communicating with the first recess, a housing supported by the frame, the housing defining a second recess and a second port communicating with the second recess, a drive shaft rotatably supported in the housing, and a sprocket supported on the drive shaft for rotation with the drive shaft, the dowel assembly comprising:
   a dowel body positioned between the frame and the housing, the dowel body extending along an axis, the dowel body having a first end portion received in the first recess and a second end portion received in the second recess, the dowel body defining a passageway having a first end communicating with the first port and a second end communicating with the second port; and
   a seal arrangement including
      an end seal member arranged on the first end portion and engageable with the end wall of the first recess, and
      a carrier member supported by the dowel body and supporting the end seal member, the carrier member being supported for movement along the axis relative to the dowel body to provide engagement of the end seal member with the end wall.

9. The dowel assembly of claim 8, wherein the carrier member is an annular member generally centered about the axis.

10. The dowel assembly of claim 8, wherein the dowel body defines an axially-facing annular groove operable to receive at least a portion of the carrier member, the at least a portion of the carrier member being movable along the axis in the groove.

11. The dowel assembly of claim 10, wherein the carrier member is biased along the axis and out of the groove.

12. The dowel assembly of claim 11, wherein the groove has an end wall, and wherein the sealing arrangement includes an o-ring positioned between the carrier and the end wall of the groove and operable to bias the carrier member relative to the dowel body.

13. The dowel assembly of claim 12, wherein the carrier member has an axial wall and a radial wall extending from the axial wall, the o-ring being positioned between the radial wall and the end wall of the groove.

14. The dowel assembly of claim 13, wherein the carrier has a radial lip axially spaced from the radial wall, the o-ring being captured between the radial lip and the radial wall.

15. The dowel assembly of claim 14, wherein the o-ring includes a first o-ring captured between the radial wall and the radial lip and a second o-ring positioned between the first O-ring and the end wall of the groove.

16. The dowel assembly of claim 8, wherein a combined recess depth is defined between the end wall of the first recess and the end wall of the second recess, wherein the dowel body has a body length less than the combined recess depth, and wherein the carrier member and the end seal member are movable relative to the body a distance equal to the difference between the combined recess depth and the body length to provide engagement of the end seal member with the end wall.

17. The dowel assembly of claim 8, wherein the end seal member includes an O-ring.

18. The dowel assembly of claim 8, wherein the end seal member is separate from and connectable to the carrier member.

19. A dowel assembly for a conveyor assembly, the conveyor assembly including a frame defining a first recess having a side wall and a first port communicating with the first recess, a housing supported by the frame, the housing defining a second recess and a second port communicating with the second recess, a drive shaft rotatably supported in the housing, and a sprocket supported on the drive shaft for rotation with the drive shaft, the dowel assembly comprising:
   a dowel body positioned between the frame and the housing, the dowel body extending along an axis, the dowel body having a first end portion received in the first recess and a second end portion received in the second recess, the dowel body defining a passageway having a first end communicating with the first port and a second end communicating with the second port; and
   a seal arrangement including
      a side seal member arranged on the first end portion and engageable with the side wall of the first recess, and
      a carrier member supported by the dowel body and supporting the side seal member, the carrier member being supported for movement transverse to the axis relative to the dowel body to provide engagement of the side seal member with the side wall.

20. The dowel assembly of claim 19, wherein the carrier member is an annular member extending about the axis.

21. The dowel assembly of claim 19, wherein the dowel body defines a radially-facing annular groove operable to receive at least a portion of the carrier member, the at least a portion of the carrier member being movable transverse to the axis in the groove.

22. The dowel assembly of claim 21, wherein the dowel body includes a main body portion and a separate end body portion, the main body portion and the end body portion cooperating to define the annular groove, and wherein the carrier member is retained on the main body portion by the end body portion.

23. The dowel assembly of claim 22, wherein the main body portion and the end body portion are connected by a press-fit.

24. The dowel assembly of claim 19, wherein the first end portion has a first diameter, and wherein the second end portion has a second diameter, the second diameter being greater than the first diameter.

25. The dowel assembly of claim 24, wherein the carrier member has a third diameter greater than the first diameter.

26. The dowel assembly of claim 25, wherein the third diameter is substantially equal to the second diameter.

27. The dowel assembly of claim 19, wherein the side seal member includes an o-ring.

28. The dowel assembly of claim 27, wherein the side seal member includes two O-rings spaced apart along the axis.

29. The dowel assembly of claim 19, wherein the end seal member is separate from and connectable to the carrier member.

30. A dowel assembly for a conveyor assembly, the conveyor assembly including a frame defining a first recess having an end wall and a side wall and a first port communicating with the first recess, a housing supported by the frame, the housing defining a second recess and a second port communicating with the second recess, a drive shaft rotatably supported in the housing, and a sprocket supported on the drive shaft for rotation with the drive shaft, the dowel assembly comprising:
   a dowel body positioned between the frame and the housing, the dowel body extending along an axis, the dowel body having a first end portion received in the first recess and a second end portion received in the second recess, the dowel body defining a passageway having a first end communicating with the first port and a second end communicating with the second port; and a seal arrangement including
- an end seal member arranged on the first end portion and engageable with the end wall of the first recess,
- a first carrier member supported by the dowel body and supporting the end seal member, the first carrier member being supported for movement along the axis relative to the dowel body to provide engagement of the end seal member with the end wall,
- a side seal member arranged on the first end portion and engageable with the side wall of the first recess, and
- a second carrier member supported by the dowel body and supporting the side seal member, the second carrier member being supported for movement transverse to the axis relative to the dowel body to provide engagement of the side seal member with the side wall.

31. A conveyor assembly comprising:
a frame defining a first recess and a first port communicating with the first recess;
a housing supported by the frame, the housing defining a second recess and a second port communicating with the second recess;
a dowel assembly positioned between the frame and the housing, the dowel assembly including
a dowel body positioned between the frame and the housing, the dowel body extending along an axis, the dowel body having a first end portion received in the first recess and a second end portion received in the second recess, the dowel body defining a passageway having a first end communicating with the first port and a second end communicating with the second port; and
a seal arrangement including
- an end seal member arranged on the first end portion and engageable with the end wall of the first recess,
- a first carrier member supported by the dowel body and supporting the end seal member, the first carrier member being supported for movement along the axis relative to the dowel body to provide engagement of the end seal member with the end wall,
- a side seal member arranged on the first end portion and engageable with the side wall of the first recess, and
- a second carrier member supported by the dowel body and supporting the side seal member, the second carrier member being supported for movement transverse to the axis relative to the dowel body to provide engagement of the side seal member with the side wall;

a drive shaft rotatably supported in the housing; and
a sprocket supported on the drive shaft for rotation with the drive shaft.

32. The conveyor assembly of claim 31, wherein the dowel body engages the frame and the housing to limit relative rotational movement between the frame and the housing.

33. The conveyor assembly of claim 31, wherein the passageway through the dowel body is operable to communicate lubricant between the first port in the frame and the second port in the housing.

* * * * *